United States Patent [19]

Bratton et al.

[11] Patent Number: 4,701,340
[45] Date of Patent: Oct. 20, 1987

[54] IMPINGEMENT AND STEAM OVEN APPARATUS FOR PREPARING FOOD PRODUCTS

[75] Inventors: Ronald E. Bratton; Richard W. Gigandet; Mitchell C. Henke; Daniel S. Kaminski; Michelle A. Wibel, all of Fort Wayne, Ind.

[73] Assignee: Lincoln Foodservice Products, Inc., Fort Wayne, Ind.

[21] Appl. No.: 806,701
[22] Filed: Dec. 9, 1985
[51] Int. Cl.⁴ .......................... A21B 1/00; A23L 1/01
[52] U.S. Cl. .................................. 426/511; 99/339; 99/389; 99/443 C; 126/20; 126/21 A; 219/401; 426/523
[58] Field of Search .................. 426/511, 510, 523; 99/339, 386, 443 C, 389, 391; 126/41 C, 21 A, 20; 219/401, 525; 422/26

[56] References Cited

U.S. PATENT DOCUMENTS

| | | | |
|---|---|---|---|
| 369,836 | 9/1887 | Blackman | 99/323.4 |
| 976,252 | 11/1910 | Delaih | 126/20 |
| 1,349,130 | 8/1920 | Hadaway, Jr. | 219/401 |
| 1,532,086 | 3/1925 | Shroyer | 219/401 |
| 1,651,509 | 12/1927 | Brims | 126/20.2 |
| 1,814,122 | 7/1931 | Bryson | 126/20.2 |
| 1,992,398 | 2/1935 | Ryder | 426/511 |
| 2,490,076 | 12/1949 | Maxson | 219/35 |
| 2,617,349 | 11/1952 | Tucker | 99/234 |
| 2,636,969 | 4/1953 | Lewis | 219/19 |
| 3,066,213 | 11/1962 | Webber | 219/35 |
| 3,069,994 | 12/1962 | Lewis | 99/234 |
| 3,077,530 | 2/1963 | Chase et al. | 219/38 |
| 3,191,518 | 6/1965 | Pavelka, Jr. | 99/234 |
| 3,320,945 | 5/1967 | Dunkelman | 126/369 |
| 3,502,065 | 3/1970 | Lassiter | 126/20 |
| 3,639,725 | 2/1972 | Maniscalo | 219/401 |
| 3,677,171 | 6/1972 | LeVan | 99/339 |
| 3,731,614 | 5/1973 | Smith et al. | 99/404 |
| 3,732,396 | 5/1973 | Tucker | 219/401 |
| 3,735,749 | 5/1973 | Binks et al. | 126/20 |
| 3,736,860 | 6/1973 | Vischer, Jr. | 99/339 |
| 3,774,008 | 11/1973 | Maniscalco | 219/401 |
| 3,794,016 | 2/1974 | Binks et al. | 126/369 |
| 3,814,901 | 6/1974 | Morhack | 219/401 |
| 3,820,524 | 6/1974 | Buckell | 126/20 |
| 3,884,213 | 5/1975 | Smith | 126/21 A |
| 3,902,044 | 8/1975 | Doyle et al. | 219/284 |
| 3,908,533 | 9/1975 | Fagerstrom | 99/386 |
| 3,991,737 | 11/1976 | Del Fabbro | 126/21 |
| 4,010,349 | 3/1977 | Lee | 219/401 |
| 4,011,805 | 3/1977 | Vegh | 99/467 |
| 4,039,776 | 8/1977 | Roderick | 219/401 |
| 4,121,509 | 10/1978 | Baker et al. | 99/386 |
| 4,123,969 | 11/1978 | Abbate | 99/467 |
| 4,145,604 | 3/1979 | Carlsson | 219/439 |
| 4,154,861 | 5/1979 | Smith | 426/466 |
| 4,173,215 | 11/1979 | Bureau et al. | 126/369 |
| 4,202,259 | 5/1980 | Johansson | 99/352 |
| 4,264,539 | 4/1981 | Berg | 261/142 |
| 4,343,292 | 8/1982 | Kells et al. | 126/378 |
| 4,366,749 | 1/1983 | Caridis et al. | 99/339 |
| 4,367,724 | 1/1983 | Willett | 126/20 |
| 4,409,453 | 10/1983 | Smith | 219/10.55 A |
| 4,436,082 | 3/1984 | Hiller et al. | 126/348 |
| 4,438,572 | 3/1984 | Kaminski | 34/128 |
| 4,462,383 | 7/1984 | Henke et al. | 126/21 |
| 4,467,783 | 8/1984 | Hurley et al. | 126/378 |
| 4,479,776 | 10/1984 | Smith | 432/144 |
| 4,495,932 | 1/1985 | Bratton | 126/20 |
| 4,506,598 | 3/1985 | Meister | 99/330 |
| 4,556,043 | 12/1985 | Bratton | 126/21 |

FOREIGN PATENT DOCUMENTS

| | | | |
|---|---|---|---|
| 929369 | 7/1973 | Canada | 65/31 |
| 50-10944 | 9/1976 | Japan . | |
| 2329 | of 1908 | United Kingdom . | |
| 257355 | 9/1926 | United Kingdom | 99/443 C |
| 1359294 | of 1974 | United Kingdom . | |

*Primary Examiner*—George Yeung
*Attorney, Agent, or Firm*—Jeffers Hoffman & Niewyk

[57] ABSTRACT

An oven for preparing food products such as pizza including three chambers which are serially connected and through which a conveyor carries a food product which may be received in an open-topped pan or which may be placed directly on the conveyor. The center chamber includes steam impingement structure for impinging jets of hot steam onto the top surface of the food product. The center chamber also includes a hot air impingement structure for impinging jets of hot gas onto the bottom surface of the container of the food product. The first and last chambers in the oven include hot air impingement structure for impinging hot jets of air onto both the top surface of the food product and the bottom surface of the pan.

37 Claims, 6 Drawing Figures

IMPINGEMENT AND STEAM OVEN APPARATUS FOR PREPARING FOOD PRODUCTS

BACKGROUND OF THE INVENTION

This invention relates to food preparation ovens and in particular to a food preparation oven for preparing pizza and similar food products. Specifically the invention relates to an oven for preparing food products such as pizza by means of air impingement and steam impingement.

In the fast food restaurant business, the speed with which food products can be prepared is extremely important. Due to the ever increasing competitiveness of the fast food business, restaurants need to be able to serve diners ever more quickly so that the food preparation time must be reduced. Restaurants will, therefore, be able to handle more people without adding additional space and seating areas. The need to reduce food preparation time is especially important for foods such as pizza and the like as the preparation time for pizza has normally been longer than for competing fast food products such as hamburgers, chicken, and the like.

One of the reasons that preparation time for pizzas is longer than for other fast foods is the nature of the pizza product. As opposed to other types of fast foods which primarily consist of meat products such as beef, chicken, or fish, all of which can be prepared rather quickly by grill frying or deep fat frying, pizza consists of a combination of a dough shell and a variety of toppings such as various types of cheese, meats, and vegetables such as onions, mushrooms, green peppers and the like, all of which must be adequately cooked rather than deep fried and which, therefore, require special handling. It is therefore more difficult to cook a pizza and similar food products very quickly as opposed to preparing items such as hot dogs, hamburgers, fried chicken, and the like.

To increase the speed at which pizzas are prepared, it is not sufficient to merely increase the temperature of the oven in which the pizza is cooked. An increase in temperature could result in breakdown of the components of the pizza, and could possibly result in burning the pizza.

Advances have been made in the speed at which pizzas may be prepared by improvements in prior art oven structures. Thus, in the preparation of pizzas with conventional ovens, the time for preparing a pizza was approximately 16–18 minutes from the time the pizza entered the oven to the time the pizza left the oven. Impingement ovens, such as disclosed in U.S. Pat. No. 4,462,383, which is assigned to the assignee of record of the instant application, have reduced the preparation time for pizza to approximately 8 minutes. However, it is desired to reduce the preparation time even further while retaining a high quality pizza product.

Several prior art solutions have been suggested for reducing the preparation time of pizzas and the like. These solutions have sought to decrease the preparation time of pizzas by increasing the amount of heat energy transferred to the pizza product without causing deleterious effects on the taste, texture, and appearance of the finished food product. Thus, for instance, various types of baking pans have been proposed whereby more heat energy could be supplied to a food product in a given amount of time. Additionally, it has been suggested to control the rates of heat energy impinging upon the bottom surface of a food product versus the top surface of a food product. Such an approach is disclosed in U.S. Pat. No. 4,154,861, wherein it is suggested that a greater amount of heat can be transferred to the bottom of a pizza product than to the top of a pizza product. However, applicant has found that the amount of heat energy which can be transferred to the pizza product and the like by this method is limited and that the desired reduction in preparation time for such products can, therefore, not be achieved in this manner.

Pizzas are commonly prepared with a dough shell to which is added a layer of sauce, cheese, meats and vegetables. This mass, when added to the pizza, makes heat transfer to the center of the pizza extremely difficult. If it is attempted to transfer a large amount of heat energy through the various toppings by impingement with hot air jets, the toppings will tend to burn. Thus, conventionally, most of the heat energy has been supplied to pizzas through the bottom surface. However, it has also been found that if a maximum amount of heat energy is rapidly supplied to the bottom dough layer of the pizza while the pizza is still relatively uncooked, the dough will bake rapidly and form air pockets therein, thereby forming an insulator and preventing the rapid addition of further heat energy through the cooked dough. Thus it is desired to provide an oven wherein heat energy may be rapidly supplied to both the top and bottom surfaces of a pizza and wherein the heat energy input is controlled such that the supply of heat energy to both the top and bottom surfaces of the pizza is maximized without cooking the pizza dough too rapidly.

Another problem with rapidly adding heat energy to the pizza by means of conventional air impingement is that it may cause the outer layers of the pizza toppings to dry out, thereby resulting in unacceptable appearance, texture, and flavor of the pizza. In some prior art pizza ovens, it has been suggested to spray moisture into the hot air supply for the air impingement jets. The added moisture helps prevent drying out of the top surface of the pizza. However, a disadvantage of adding moisture to the hot air stream is that the water absorbs heat energy from the hot air and thereby cools the air. What is therefore desired is to provide an oven wherein high heat energy may be transferred to a pizza product for a reduction in cooking time while achieving acceptable quality of the cooked pizza product.

It has been proposed in the prior art ovens to use steam for preparing food products such as meat. The use of steam is advantageous because of the large amount of heat energy which is released when the steam gives up its latent heat of vaporization. Steam is therefore an efficient heat transfer medium. However, due to the effect of steam on the appearance of food, it has been suggested to use both steam and infrared heat whereby the meat products are cooked rapidly by the steam and are broiled by the infrared energy to give an acceptable texture and appearance to the meat products. One example of an oven incorporating steam and infrared energy is disclosed in U.S. Pat. No. 3,736,860, wherein a conveyor is used to move food products contained in open shallow pans through an oven and wherein steam is sprayed from a plurality of spray tubes both onto the top surface of the food products and onto the bottoms of the pans wherein the food is contained. The disadvantage of this method is that the steam will not be very effective in transferring heat to the food through the bottom of the pan unless the steam is superheated to a high degree. However, if the steam is superheated to a high degree, the steam, which is sprayed onto the top surface of the food product, may cause the food to have an unacceptable appearance and to be overcooked or possibly to burn. Furthermore, to generate highly superheated steam requires complicated steam generating equipment which is undesirable in the oven environment.

It has also been suggested to cook food products by means of both steam and hot air convection. However, convection processes are not nearly as efficient in transferring heat to a food product as are impingement processes and therefore convection and steam processes are not sufficiently effective in reducing the time necessary to cook food products.

It is therefore desired to provide a food preparation apparatus for cooking pizzas wherein a very efficient heat transfer mechanism is used. It is furthermore desired to provide such an apparatus wherein the heat transfer process is designed in such a way to eliminate the above-identified problems in the preparation of pizza and similar food products. It is also desired to provide a food preparation apparatus wherein the sequencing of heat energy transfer to the food product is arranged for maximum cook time reduction. Lastly, it is desired to provide a food preparation apparatus wherein a pizza product or the like is provided which is cooked in a minimum amount of time and which is of high quality in appearance, texture, and flavor.

SUMMARY OF THE INVENTION

The present invention overcomes the disadvantages of the above-described prior art methods and ovens for preparing pizza and similar types of food product by providing an improved apparatus and method therefor.

The food preparation apparatus according to the present invention, in one form thereof, provides an oven chamber including a conveyor for moving a pan containing a pizza or other food product through an oven chamber. The food product could also be placed directly on the conveyor. A plurality of steam tubes are located above the conveyor. The steam tubes include apertures directed toward the top of the food product whereby steam jets are impinged upon the top surface of the food product as it travels on the conveyor through the oven chamber. The chamber must be arranged to provide the best heating cycle for preparing a food product in a minimum amount of time. Additionally, a plurality of heated air impingement jets are provided below the conveyor. The conveyor is perforated, whereby the hot air jets impinge upon the bottom of the container as it travels on the conveyor through the oven chamber.

The present invention, in one form thereof, furthermore comprises three serially connected oven chambers. An endless conveyor is disposed in the three chambers and supports either an open-topped container including a pizza or other food product therein or directly supports a food product. In the first and last of the oven chambers, air impingement apparatuses are disposed above, if desirable, and below the conveyor whereby hot air jets are impinged both on the top surface of the food product and onto the bottom surface of the container for the food product. The center chamber includes a steam impingement apparatus disposed above the conveyor whereby steam jets are impinged on the top surface of the food product. Furthermore, the center chamber includes an air impingement apparatus disposed below the conveyor for impinging heated air jets upon the bottom surface of the food or food container carried by the conveyor. It should be understood that the chambers may be rearranged and that the invention provides a staged cycle for heating a food product by the utilization of a plurality of serially arranged chambers using steam and hot air impingement.

The present invention, in one form thereof, still further comprises a method for cooking a food product wherein the food product is received in an open container which is moved through an oven chamber. A plurality of columnated jets of heated air are provided below the food product for impinging jets of heated air against discrete points on the bottom surface of the container or food. Furthermore, a plurality of columnated jets of steam are formed which are impinged on the top surface of the food product as it travels through the oven chamber.

One advantage of the present invention is that the method and apparatus enable the rapid preparation of pizzas and other like food products.

A further advantage of the present invention is that it permits rapid preparation of food products while providing a product with superior flavor, appearance, and texture.

Another advantage of the present invention is that it enables the efficient transfer of large amounts of heat energy into the food product while enhancing the flavor of the food product.

Still another advantage of the invention is in that by providing a plurality of oven chambers in the apparatus, which chambers may be arranged serially as desired, the cooking process can be controlled individually in each chamber to provide an optimum staged cooking cycle for preparing a superior food product in a minimum amount of time.

The invention, in one form thereof, comprises a food preparation apparatus comprising a cooking chamber and a means for supporting a food product in the chamber. An air impinging means is disposed in the chamber for forming a plurality of columnated jets of heated gas and for impinging the heated gas jets against discrete points of a food product supported on said support means. Means is also provided in the chamber for impinging jets of steam against the food product supported on the support means.

The present invention, in one form thereof, comprises a food preparation apparatus including a first oven chamber, means for supporting a food product in the first chamber, and air impinging means disposed in the first chamber for impinging columnated jets of heated air onto discrete points of a food product surface. A second oven chamber is provided in communication with the first oven chamber and a food product supporting means is provided in the second chamber. Steam impingement means is provided in the second chamber for impinging jets of steam onto discrete points of a food product surface supported on the food product supporting means. A third oven chamber is provided in communication with the second chamber and a food product supporting means is provided in the third chamber. Air impinging means is disposed in the third chamber for impinging columnated jets of heated air onto discrete points of a surface of the food product supported on a food supporting means. Means is provided for moving a food product from the first chamber through the second and third chambers.

The present invention, in one form thereof, still further provides a food preparation apparatus comprising a first oven chamber and means in the first oven chamber for forming columnated jets of steam and for impinging the steam jets onto the top surface of a food product received in a container which is disposed in the first chamber. Means is provided in the first oven chamber for forming columnated jets of heated air and for impinging the heated air jets onto a bottom surface of the food product container. A second chamber is disposed in serial communication with the first oven chamber and forms a continuous cavity therewith. Means is provided for moving a food product container through the first and second chambers and means is provided in the second chamber for forming columnated jets of heated air and for impinging the heated jets of air onto both a surface of the moving food product and a surface of the container therefor.

The present invention, in one form thereof, comprises a method for cooking a food product comprising the steps of supporting the food product in an open container and forming a plurality of columnated jets of heated air. The jets of heated air are then directed onto an outside surface of the container so that the jets of heated air impinge against discrete points of the outside surface of the container. A plurality of columnated jets of steam are formed and are directed against a surface of the food product so that the steam jets impinge against discrete points of the food product surface. The food product is moved relative to the air jets and the steam jets.

The present invention, in one form thereof, also provides a method for heating a food product comprising the steps of supporting a food product in an open container and providing a cavity including a plurality of serially connected oven chambers. The food product is moved through the plurality of chambers. A plurality of columnated jets of heated air are formed and are impinged onto a bottom surface of the container and a top surface of the food product as the food product moves through the chambers. Jets of steam are impinged onto a top surface of the food product as it moves through one of the chambers.

It is an object of the present invention to provide a food preparation apparatus and method whereby pizza and other food products may be cooked very rapidly.

Another object of the present invention is to provide a method and apparatus for rapidly preparing a food product while enhancing the flavor of the food product.

A further object of the present invention is to provide an impingement process for preparing a food product whereby large amounts of heat energy may be transferred to the food product without burning or degrading of the food product.

Still another object of the present invention is to provide an impingement food preparation apparatus wherein both steam jets and hot air jets are used for transferring heat energy to the food product.

A still further object of the invention is to provide a food preparation apparatus which includes several oven chambers whereby the food product travels serially through the chambers for impingement of air and steam jets onto the food product and the container therefor.

Yet a further object is to provide a steam and hot air impingement food preparation oven comprising a plurality of chambers which may be arranged to provide an optimum cooking cycle for a food product.

BRIEF DESCRIPTION OF THE DRAWING

The above mentioned and other features and objects of this invention and the manner of attaining them will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1-4, there is disclosed an oven 10 supported on a support frame 12 which is provided with casters 14 so that the unit may be moved about.

Figure 1:
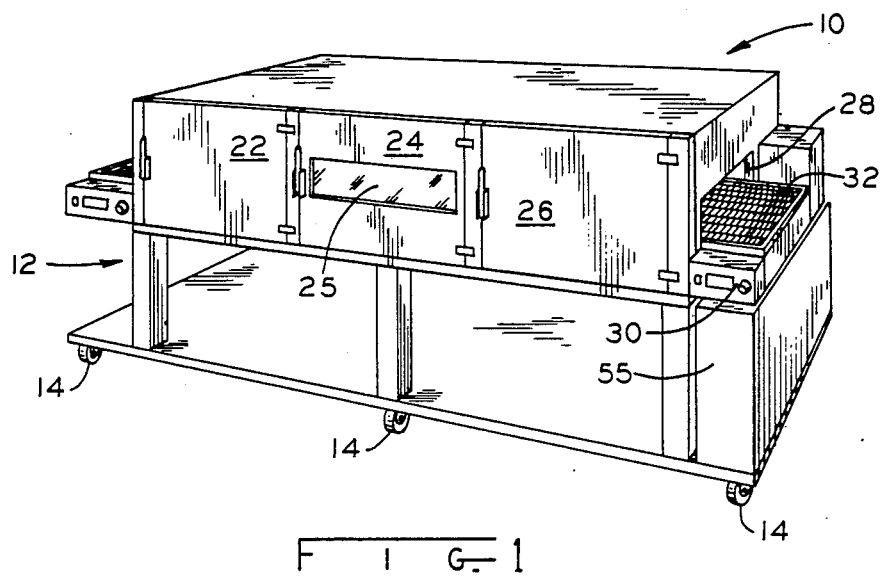
FIG. 1 is a perspective view of a food preparation apparatus incorporating a preferred embodiment of the present invention.
Figure 2:
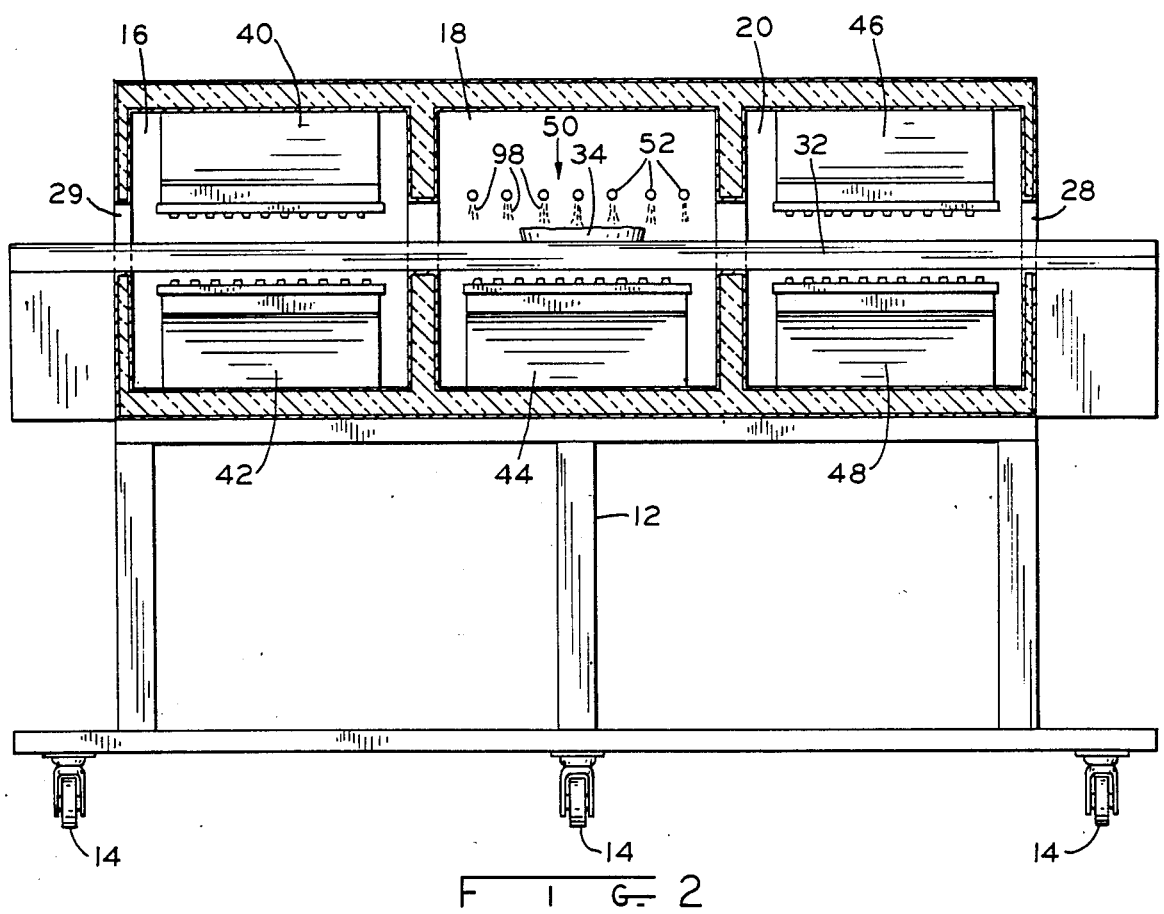
FIG. 2 is a front elevational view, in cross section, of the food preparation apparatus of FIG. 1.

As best seen in FIG. 2, the oven includes three oven chambers, 16, 18, and 20, which are serially connected. Each of the chambers 16, 18, and 20 is provided with a door respectively numbered 22, 24, and 26. Door 24 for center chamber 18 includes a window 25. If desired, doors 22 and 26 could also be provided with windows to view the progress and condition of the food as it travels through the oven cavity. End chambers 16 and 20 are each provided with respective end openings 29 and 28 whereby an endless conveyor 32 may extend through the end openings 29 and 28 of chambers 16 and 20 so that food items may travel serially through each of the oven chambers as best shown in FIG. 2. If desired, conveyor 32 could consist of three sections, one each for each of oven chambers 16, 18, and 20 so that the speed of travel of the food product through the chambers could be individually controlled for each chamber. Control 30 may be provided for controlling the speed of the conveyor, the temperature of the respective oven chambers, and the like. For illustrative purposes, a container or pan 34 is shown supported on conveyor 32, the pan being an open-topped pan for containing a food product such as commonly used for baking pizza. While pizza is used as an example of a food product which can be advantageously prepared in the oven apparatus according to the invention, it should be understood that other types of food products may also be advantageously prepared in an oven apparatus according to the invention. Thus, a plurality of such pans could be deposited on the conveyor so that they will travel through the oven chambers as the continuous belt of conveyor 32 travels through the oven chambers. Alternatively, pizza or other food products could be supported directly on the conveyor without the use of a pan. The details of the construction of the conveyor do not form a part of the instant invention and are further described in U.S. Pat. No. 4,462,383 assigned to the assignee of the instant application and which patent is incorporated herein by reference.

What has therefore been described so far is an oven apparatus comprising three serially connected oven chambers, each of which may be individually controlled so that a staged baking cycle may be established for a pizza product or other similar food item to bake or cook the product in a minimum amount of time with superior flavor, texture, and appearance.

Figure 4:
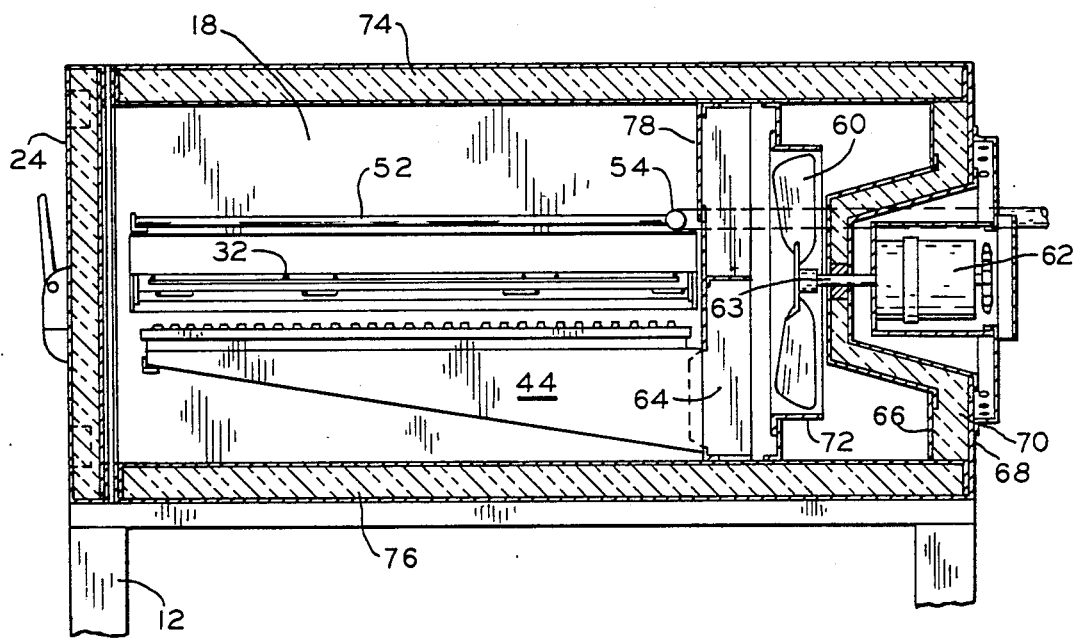
FIG. 4 is a cross sectional view of the oven of FIG. 1 taken along line 4—4 of FIG. 3.

Referring further to FIGS. 2 and 4, oven chamber 16 is provided with impingement fingers 40 and 42, which fingers are positioned to direct jets of heated, high velocity air jets onto the bottom surface of pan 34 and the top surface of food item 36 contained therein and supported by conveyor 32. The specific construction of fingers 40 and 42 is more fully described in U.S. Pat. No. 4,154,861, which patent is incorporated herein by reference. Impingement fingers for supplying heated air to the food product and the container therefor are also shown located in oven chambers 18 and 20, which fingers are similar to fingers 40 and 42. Thus finger 44 in chamber 18 supplies heated high velocity air jets to the bottom surface of container 34 as it travels through chamber 18. Similarly fingers 46–48 are provided in chamber 20 for heating both the top surface of pizza 36 and the bottom surface of container 34.

It should also be noted that for control of heat energy transfer some or all of the apertures of fingers 40–48 may be closed off. Thus, for instance, it has been found that for best results with a pizza product, the apertures of finger 42 are partially closed off and the apertures of finger 46 are completely closed off.

Figure 3:
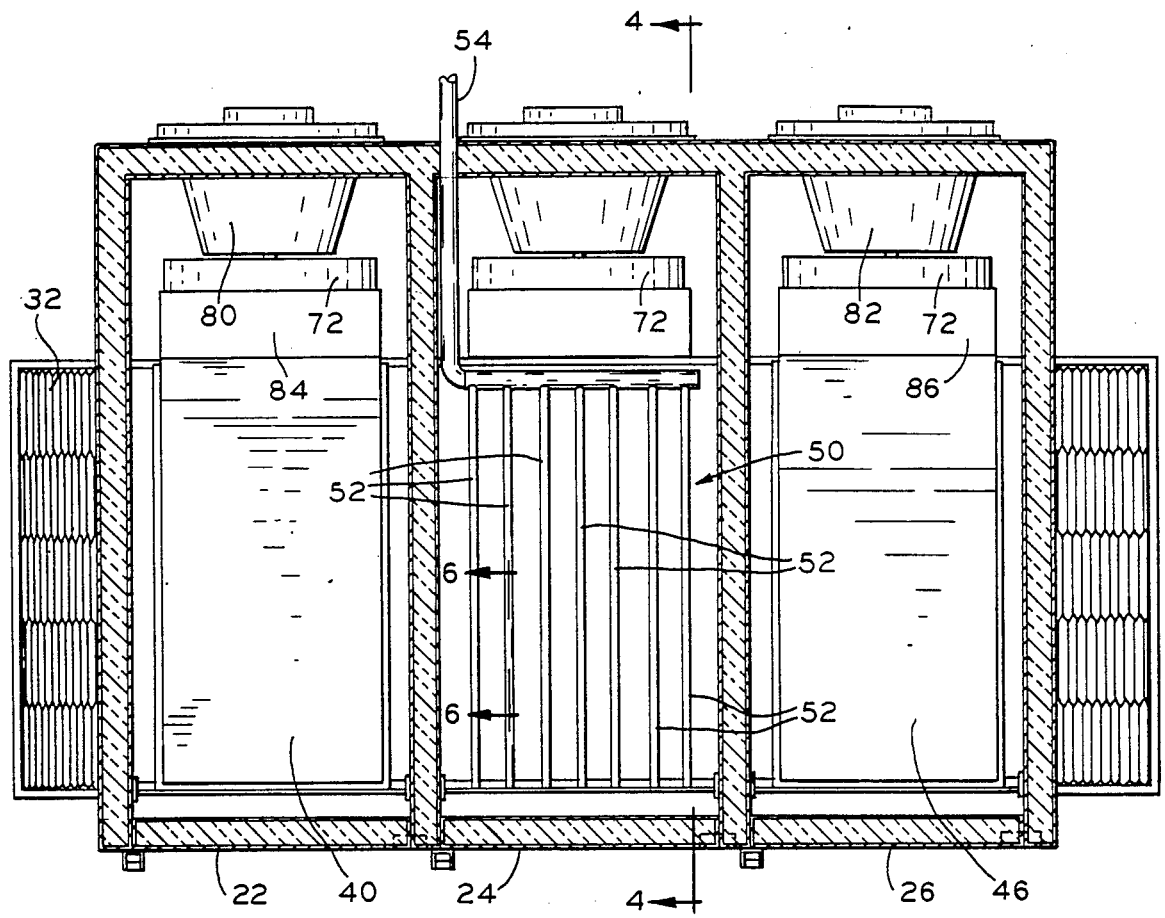
FIG. 3 is a plan view in cross section of the food preparation apparatus of FIG. 1.

Further, as best shown in FIGS. 2, 3, and 4, a steam impingement apparatus 50 is provided in chamber 18, including steam tubes 52 which are connected to a manifold 54 to which steam is provided from a source of steam (not shown). A steam generator could be provided at 55 in FIG. 1. Such steam generators are conventional and form no part of the present invention. Thus, steam jets are provided by steam tubes 52 for impinging directly onto the top surface of the food product 36 in container 34 as it travels through chamber 18. Apertures 96 in steam conduits 52 are approximately 3/64 to 3/16 of an inch in diameter. If the apertures are too large, the steam does not impinge in properly columnated jets onto the pizza. If the openings are too small, an insufficient quantity of steam is impinged upon the food product. Apertures 96 are spaced approximately 1½ inch to 2 ½ inch above the top surface of the pizza product. If the spacing is too close, the high velocity jets may blow the toppings off the pizza. If the jets are spaced too far away, too much turbulence is introduced into the jets and the jets are not sufficiently coherent so that insufficient impingement takes place.

Referring now to FIG. 4, the air supply and finger support structure for oven chamber 18 and impingement finger 44 is shown. This structure does not form part of the instant invention and is more fully described in U.S. Pat. No. 4,438,572, which patent is assigned to the assignee of record and of the instant application, and which patent is incorporated herein by reference.

A fan 60 is provided which is driven by means of a motor shaft 63 by motor 62. A plenum 64 is shown into which the air is forced by fan 60. Furthermore, the structure includes a back wall assembly for the oven including an inner wall 66, an outer wall 68, and insulation material 70 included therebetween. A collar 72 is provided for guiding the air from fan 60 into plenum 64. The air supplied to chamber 18 by means of impingement fingers 44 therefore flows back through the chamber to the air supply structure whereafter the air is heated by a burner (not shown). Such burners are described and disclosed in U.S. Pat. No. 4,457,291, which is assigned to the assignee of record of the instant application and which patent is incorporated herein by reference.

The fan forces the heated air through plenum 64 and finger 44 to further heat the food product. It should also be understood that each of the chambers 16, 18, and 20, includes its own air heating and air flow structure, including a fan, plenum, finger support structure, ducting and the like so that each of the chambers may be independently operated at a desired temperature, as desired. It should be noted that chambers 16 and 20 also include air impingement fingers 40 and 46 located above conveyor 32. The construction of these fingers is substantially similar to finger 44 as described in the above referenced U.S. Pat. No. 4,438,572. The air flow structure is designed so that the amount of air loss through end openings 28 and 29 of the assembly is minimized, thereby conserving energy, preventing heat loss, improving the efficiency of the apparatus, and insuring that the ambient temperature of the area wherein the oven is located does not increase excessively.

The oven assembly also includes a top wall 74, a bottom wall 76, and a rear wall 78 for each chamber 16, 18, and 20. Chamber 16 also includes an inner wall 80 and a plenum 84. Similarly, chamber 20 includes an inner wall 82 and a plenum 86. The construction of the plenums, inner walls and the details of chambers 16 and 20 is similar to that of chamber 18 illustrated in FIG. 4 and described hereinabove.

Figure 6:
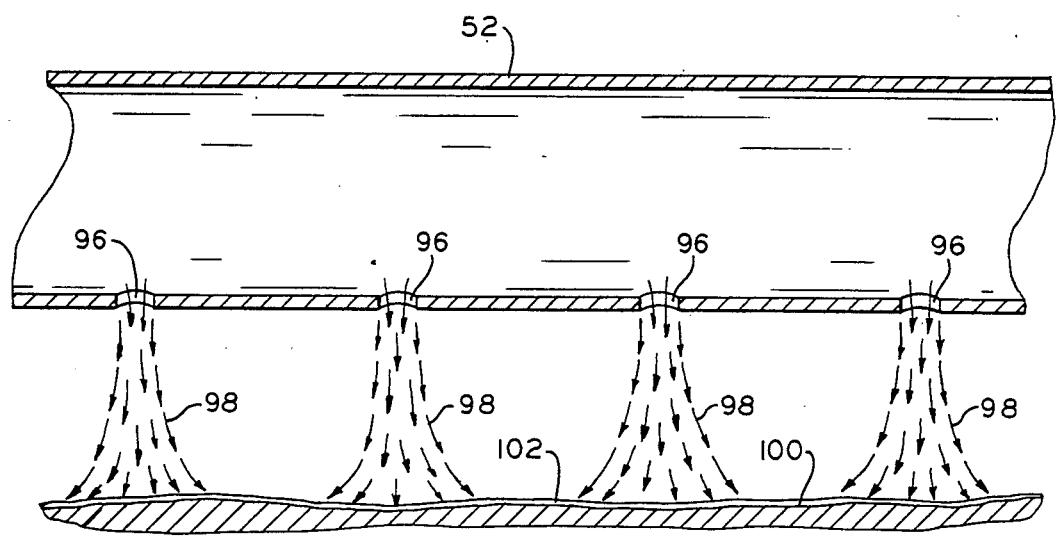
FIG. 6 is a cross sectional view of a steam impingement tube taken along line 6—6 of FIG. 3.

Referring now to FIG. 6, there is shown an enlarged portion of a steam tube 52 including apertures 96 through which steam jets 98 are impinged upon the top surface 100 of pizza 36 contained in pan 34. It can be seen that the jets of steam are well-defined so that they will impinge upon localized areas of the top surface 100 of pizza 36.

Figure 5:
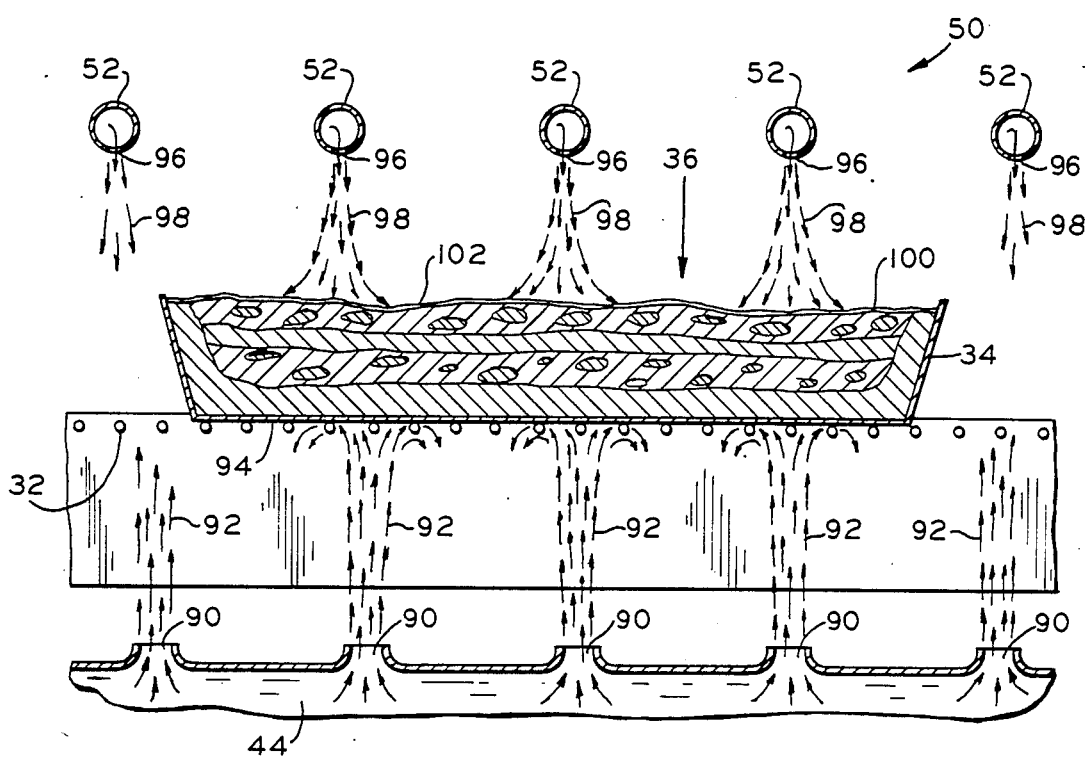
FIG. 5 is an enlarged partial view, in cross section, of a pizza container including a pizza product therein as it travels through the steam impingement oven cavity of the apparatus of FIG. 1.

Referring to FIG. 5, a plurality of steam tubes 52 are shown including apertures 96 for forming steam jets 98 and for impingement directly upon the top surface 100 of pizza 36. Furthermore, it can be seen that the jets of hot gas 92 emanating from apertures 90 of fingers 44 travel through perforated conveyor 32 to impinge upon localized areas of the bottom surface 94 of pan 34. The manner in which hot gas jets 92 heat the bottom surface 94 of pan 34 is further explained in the above-identified U.S. Pat. No. 4,154,861.

In operation, the oven assembly functions as follows in the preparation of a pizza product. It should be understood that the apparatus is also suitable for preparing other food products and that an optimum cooking cycle could be established for each such products by management of the steam and air impingement assemblies, the temperatures and velocities of the steam and hot air, and the number of chambers used. A pan 34 including a pizza 36 or other suitable food product contained therein is deposited on a conveyor 32 which travels from left to right as viewed in FIG. 2. As the pan enters the first oven chamber 16, the pan will travel between impingement fingers 40 and 42, whereby jets of heated air will impinge upon the top surface 100 of the pizza and the bottom surface 94 of the pan 34. At this point in time, the pizza is relatively cool as it will generally have been refrigerated in preparation for baking. By impinging the jets of heated air upon the relatively cool surface 94, the fluid in the jets is diffused to wipe away the boundary layer of air and moisture from the discrete points of the food surface 100 and pan surface 94 upon which the jets impinge. The jets of heated gas will sweep away the boundary layer of cool air surrounding the relatively cool pizza product. Therefore, the cool boundary layer is replaced by a hot air boundary layer for transfer of heat energy to the pizza pan and the pizza. The pizza will, in most cases, be at approximately 40° F.–50° F. as it enters the oven. The jets of hot air are preferably at approximately 400° F.–700° F. for most food products. The pan, being a good conductor, will heat up fairly quickly to approximately 300° F.–400° F. If the jets of air are too hot, the pizza will burn or the outside surface of the pizza will be cooked too rapidly whereby the outside may become over cooked while the inside of the pizza is still undercooked. The cheese on the top surface 100 of the pizza will melt and form a layer. Care should be taken that this layer of cheese is not burned or browned too quickly. The toppings, being quite dense, absorb most of the heat energy transferred to the top of the pizza, thus preventing much heat energy transfer into the center of the pizza through the top layer by hot air convection. However, the pan 34 is a good conductor whereby further heat may be efficiently transferred to the pizza through the bottom of the pizza by means of the pan and the hot air impingement process. It should also be noted that, in order to prevent the dough layer from cooking too rapidly and forming an insulator, thus preventing rapid addition of heat energy to the center of the pizza through the bottom surface, it is preferable to control the heat energy input through finger 42 by partially closing off the apertures 90 in finger 42. Similarly, to prevent burning of the toppings, the heat energy input through finger 40 should be controlled by partially closing off the apertures in finger 40. As the pizza travels from chamber 16 to chamber 18, the pizza will have warmed up somewhat, although it is still relatively cool compared to the temperature of the oven cavity and hot impingement air jets which are in the range of 400° F.–700° F.

Thus, as the pizza travels from chamber 16 to chamber 18, the pan is at about 300° F.–400° F. whereas the pizza itself is relatively cooler and is at approximately 70° F.–90° F. The steam exiting from nozzles 96 is slightly superheated in the range of 240° F.–250° F. which is above the temperature of the pizza but below the temperature of pan 34. The steam, of course, carries a great amount of heat energy due to the latent heat of vaporization of the steam and the superheating. Thus, as the hot steam jets 98 impinge upon the relatively cool top surface 100 of pizza 36, the steam will condense to water and will thereby transfer its superheat and its heat of vaporization to pizza 36. Furthermore, the condensed steam will add a layer of water, indicated at 102, onto the top of the pizza. It is, of course, well known that water is an excellent conductor. Therefore, by the continuous impingement of jets of steam 98 onto surface 100 and water layer 102 as pizza pan 34 travels through chamber 18, jets 98 will continue to heat up water layer 102 as additional steam condenses and gives up its heat of vaporization to the pizza product. Furthermore, since the steam is superheated, this superheat is also transferred to water layer 102 and the pizza. The good heat conductivity of water layer 102 will therefore aid in transferring heat energy to the pizza product. In essence, therefore, the hot jets of steam 98 have generated a good heat conductor 102 for the top surface 100 of the pizza 36. The bottom of the pizza already includes a good heat conductor in the form of metal pan 34. Therefore, the entire pizza product is now enveloped in a good heat transfer envelope consisting of the water layer 102 and the metal layer of the pizza pan 34.

It should also be noted that, while pizza has been described in the preferred embodiment as the food to be prepared, other suitable foods could be substituted therefor. The oven apparatus is versatile and the air and heat velocities, arrangement of the steam and air impingement structures, steam and air temperatures, and the arrangement and number of oven chambers may be varied to adapt the apparatus for use with other types of food products.

It should, of course, also be noted that since the bottom of the pan 34 is heated up to approximately 300°–400° F. in the first oven chamber 16, if steam jets were located below conveyor 32 in the second oven chamber 18, the steam jets 98 being at approximately 240°–250° F., would not be able to heat up the pizza pan 34 and would, in fact, cool pan 34 as it travels through chamber 18. Furthermore, it should also be noted that if, in the preparation of a pizza product, steam were to be provided in the first chamber 16, the steam, being an excellent heat transfer medium, would heat up the pizza product so rapidly that the dough in the pizza product would be cooked quickly and form air pockets and thereby form an insulator and prevent further rapid heat energy addition to the pizza product. It is therefore important in the preparation of a pizza product that the temperatures of the air impingement jets in chamber 16 not be too high so that the addition of heat energy to the pizza product in the first chamber 16 is as high as possible without quickly overcooking the outside surface of the pizza.

In the center chamber 18, as much heat energy as possible is added to the pizza by the steam and air impingement process. The last chamber 20 through which the pizza travels completes the cooking process and allows the water layer 102 to be evaporated thereby drying surface 100 and permitting the cheese to brown properly. The temperature in the last oven chamber 20 is preferably approximately 400° F.–700° F. to complete the cooking process. To control heat energy input in the third chamber, apertures in fingers 46 and 48 may be closed off as described hereinabove. The temperature of the pizza product as it exits from the oven is approximately 165° F. There is, of course, a gradient of humidity through the oven assembly. The greatest humidity level is found in chamber 18 and the humidity levels in chambers 16 and 20 are smaller. Some moisture, of course, is lost from the system by the loss of air through openings 29 and 28 at the ends of the oven assembly.

By using steam for cooking the top surface of the pizza, the color, texture, and flavor of the pizza product is improved as compared to conventionally cooked pizzas. This is primarily due to the fact that the pizza is cooked in a shorter amount of time than conventional pizzas, whereby the vegetables are not overcooked. Furthermore, by cooking the pizza in a moist environment, less moisture is removed from the vegetables than by conventional pizza ovens.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A food preparation apparatus comprising:
   a cooking chamber;
   means for conveying a food product through said chamber;
   means for heating a supply of air;
   air impinging means in said chamber connected to said air heating means for forming a plurality of columnated heated air jets and for impinging said heated air jets against a plurality of discrete points of a surface of a food product supported on said conveying means; and
   means in said chamber for impinging jets of steam against a plurality of discrete points of a surface of said food product supported on said conveying means.

2. The apparatus of claim 1, wherein said steam impinging means is disposed above such food product support means and said air impingment means is disposed below such food product support means.

3. The apparatus of claim 1, wherein said steam impinging means comprises a plurality of tubes disposed above said food product, said tubes including apertures for forming columnated jets of steam directed toward the top surface of said food product.

4. The apparatus of claim 1, wherein said food supporting means comprises a perforated conveyor.

5. The apparatus of claim 1, including means for superheating steam and for supplying said steam to said steam impinging means.

6. The apparatus of claim 1, including a second cooking chamber disposed in serial communication with said first cooking chamber;
   said means for conveying adapted to convey said food product serially through said first and second cooking chambers; and
   means in said second chamber for forming a plurality of columnated jets of heated air and for impinging said jets of air against discrete points of a surface of said food product as said food product is conveyed through said second chamber.

7. The apparatus of claim 6, and including a third cooking chamber disposed in serial communication with said first and second cooking chambers;
   said means for conveying adapted to convey said food product serially through said three cooking chambers; and
   means in said third cooking chamber for forming columnated jets of heated air and for impinging said jets against discrete points of a surface of said food product as said food product is conveyed through said third chamber.

8. A food preparation apparatus comprising:
   a first oven chamber;
   first means for supporting a food product in said first chamber;
   air impinging means disposed in said first chamber for impinging columnated jets of heated air onto discrete points of a surface of a food product being supported on said first food supporting means;
   a second oven chamber in communication with said first oven chamber;
   second means for supporting a food product in said second chamber;
   steam impinging means in said second chamber for impinging jets of steam onto discrete points of a surface of a food product being supported on said second food product supporting means;
   a third oven chamber in communication with said second chamber;
   third means for supporting a food product in said third chamber;
   air impinging means disposed in said third chamber for impinging columnated jets of heated air onto discrete points of a surface of a food product being supported on said third food supporting means; and
   means for conveying a food product serially from said first supporting means to said second and third supporting means.

9. The apparatus of claim 8, wherein said steam impinging means is disposed above said second food product supporting means.

10. The apparatus of claim 8, wherein said steam impinging means comprises a plurality of tubes disposed above and adjacent to said food product second supporting means, said tubes including apertures directed toward said food product supporting means.

11. The apparatus of claim 8, wherein said food product supporting means comprises a perforated conveyor.

12. The apparatus of claim 8, including means for superheating steam and for supplying said steam to said steam impinging means.

13. The apparatus of claim 8 including air impingement means disposed in said second chamber.

14. The apparatus of claim 13, wherein said steam impingement means in said second chamber is disposed above said second food product supporting means and said air impingement means is disposed below said second food product supporting means.

15. The apparatus of claim 8, wherein said air impingment means in each of said first and third chambers comprises third means disposed above said first and third food supporting means and means disposed below said first and third food supporting means.

16. A food preparation apparatus comprising a first oven chamber;
   first means in said first oven chamber for supporting a food product container;
   means in said first oven chamber for forming columnated jets of steam and for impinging said steam jets onto the top surface of a food product received in a container supported on said first supporting means;
   means in said first oven chamber for forming columnated jets of heated air and for impinging said heated air jets onto a bottom surface of said food product container supported on said first supporting means;
   a second oven chamber disposed in serial communication with said first oven chamber;
   second means in said second oven chamber for supporting a food product container;
   means for moving a food product container from said first supporting means to said second supporting means whereby said container moves serially through said chambers; and means in said second chamber for forming columnated jets of heated air and for impinging said heated air jets onto both a surface of a food product disposed in a container supported on said second means and a surface of said container.

17. The apparatus of claim 16, wherein said steam impinging means comprises a plurality of tubes disposed above and adjacent said first means, said tubes including apertures directed toward said food product top surface.

18. The apparatus of claim 16, wherein said food product moving means comprises a perforated conveyor.

19. The apparatus of claim 16, including a third oven chamber disposed in serial communication with said first and second chambers and including third means for supporting a food product container and means for conveying a food product serially from said second means to said third means;

means in said third chamber for forming columnated jets of heated air and for impinging said heated air jets onto both a surface of a food product disposed in a container supported on said third means and a surface of said container.

20. The apparatus of claim 16, wherein said columnated air jets in said second chamber are impinged onto both a top surface of a food product supported in a container on said first means and the bottom surface of said container.

21. The apparatus of claim 16, wherein the columnated air jets in both said second and third oven chambers are adapted to impinge on the top surface of a food product disposed in a container as it is conveyed on said second and third means and the bottom surface of said food product container.

22. The apparatus of claim 16, including means for superheating steam and for supplying said steam to said steam jet forming means.

23. The apparatus of claim 19, wherein the first oven chamber is serially disposed between said second and third oven chambers.

24. The apparatus of claim 17, wherein said apertures in said tubes have a diameter in the range of 3/64 to 3/16 inch.

25. The apparatus of claim 17, wherein the distance between said apertures and the top surface of said food product is in the range of 1½ to 2½ inch.

26. A method for cooking a food product comprising the steps of:

supporting a food product in an open container;
forming a plurality of columnated jets of heated air;
directing said columnated jets of heated air onto an outside surface of said container so that the jets of heated air impinge against discrete points of said outside surface of said container;
forming a plurality of columnated jets of steam;
directing said columnated steam jets against a surface of said food product so that said steam jets impinge against discrete points of said food product surface; and
moving said food product relative to said air jets and steam jets.

27. The method according to claim 26, wherein said steam jets are directed onto a top surface of said food product and said air jets are directed onto the bottom surface of said container.

28. The method according to claim 26, including superheating said steam and heating said air to a higher temperature than said superheated steam.

29. A method for heating a food product comprising the steps of:

supporting a food product in an open container;
providing an oven cavity including a plurality of serially connected oven chambers;
moving said food product through said plurality of chambers;
forming a plurality of columnated jets of heated air;
impinging said jets of heated air onto a bottom surface of said container and a top surface of said food product as said food product moves through one of said chambers;
forming a plurality of columnated jets of steam in one of said chambers; and
impinging said jets of steam onto a top surface of said food product as said food product moves through a second one of said chambers.

30. The method according to claim 29 wherein said plurality of chambers comprises three chambers.

31. The method according to claim 30 wherein said steam jets are disposed in the middle chamber.

32. The method according to claim 29 wherein heated air is impinged against said food product and container in at least two chambers and wherein the temperature of said air jets in the first of said two chambers is lower than the temperature of said air jets in the second of said chambers.

33. The method according to claim 29 wherein the temperature of said steam jets is less than the temperature of said jets of heated air in said one chamber.

34. The method according to claim 29 wherein said steam is superheated.

35. The method of claim 29, wherein the temperature of said steam jets is in the range 230° F.–260° F.

36. The method of claim 29, wherein the temperature of said air jets is in the range of 400° F.–700° F.

37. The method of claim 29, wherein the temperature of the air jets in said first chamber is less than the temperature of the air jets in said second chamber, and wherein the temperature of the air jets in said second chamber is greater than the temperature of the air jets in said third chamber.

* * * * *